US007188078B2

(12) United States Patent
Arnett et al.

(10) Patent No.: US 7,188,078 B2
(45) Date of Patent: Mar. 6, 2007

(54) SYSTEM AND METHOD FOR COLLECTION AND ANALYSIS OF ELECTRONIC DISCUSSION MESSAGES

(75) Inventors: Nicholas D. Arnett, Sunnyvale, CA (US); David Holtzman, Herndon, VA (US); David Pool, Winchester, VA (US)

(73) Assignee: BuzzMetrics, Ltd. (IL)

( * ) Notice: Subject to any disclaimer, the term of this patent is extended or adjusted under 35 U.S.C. 154(b) by 0 days.

(21) Appl. No.: 11/239,632

(22) Filed: Sep. 28, 2005

(65) Prior Publication Data
US 2006/0080161 A1    Apr. 13, 2006

Related U.S. Application Data

(62) Division of application No. 09/686,516, filed on Oct. 11, 2000.

(51) Int. Cl.
*G06Q 17/00* (2006.01)
(52) U.S. Cl. ........................................ 705/10
(58) Field of Classification Search .................. 705/10
See application file for complete search history.

(56) References Cited

U.S. PATENT DOCUMENTS

| | | | |
|---|---|---|---|
| 5,371,673 A * | 12/1994 | Fan ................................. | 704/1 |
| 5,659,732 A | 8/1997 | Kirsch | |
| 5,659,742 A * | 8/1997 | Beattie et al. ........... | 707/104.1 |
| 5,794,412 A | 8/1998 | Ronconi | |
| 5,911,043 A | 6/1999 | Duffy et al. | |
| 5,953,718 A * | 9/1999 | Wical ............................. | 707/5 |
| 6,029,195 A * | 2/2000 | Herz .......................... | 725/116 |
| 6,035,294 A | 3/2000 | Fish | |
| 6,067,539 A | 5/2000 | Cohen | |
| 6,260,041 B1 | 7/2001 | Gonzalez | |
| 6,266,664 B1 | 7/2001 | Russell-Falla et al. | |
| 6,304,864 B1 | 10/2001 | Liddy et al. | |
| 6,314,420 B1 | 11/2001 | Lang et al. | |
| 6,362,837 B1 | 3/2002 | Ginn | |
| 6,393,460 B1 | 5/2002 | Gruen et al. | |
| 6,493,703 B1 | 12/2002 | Knight et al. | |
| 6,519,631 B1 | 2/2003 | Rosenschein et al. | |
| 6,539,375 B2 | 3/2003 | Kawasaki | |
| 6,546,390 B1 | 4/2003 | Pollack et al. | |

(Continued)

FOREIGN PATENT DOCUMENTS

WO    WO 00/17824    3/2000

OTHER PUBLICATIONS eWatch's archived web site retrieved from [URL: http://web.archive.org/web/19980522190526/www.ewatch.com] on Sep. 8, 2004, archived May 22, 1998.

(Continued)

*Primary Examiner*—Susanna M. Diaz
(74) *Attorney, Agent, or Firm*—Taft, Stettinius & Hollister LLP

(57) ABSTRACT

A system and method for collecting and analyzing electronic discussion messages to categorize the message communications and the identify trends and patterns in pre-determined markets. The system comprises an electronic data discussion system wherein electronic messages are collected and analyzed according to characteristics and data inherent in the messages. The system further comprises a data store for storing the message information and results of any analyses performed. Objective data is collected by the system for use in analyzing the electronic discussion data against real-world events to facilitate trend analysis and event forecasting based on the volume, nature and content of messages posted to electronic discussion forums.

14 Claims, 5 Drawing Sheets

U.S. PATENT DOCUMENTS

| | | |
|---|---|---|
| 6,571,234 B1 | 5/2003 | Knight et al. |
| 6,571,238 B1 | 5/2003 | Pollack et al. |
| 6,782,393 B1 | 8/2004 | Balabanovic et al. |
| 6,807,566 B1 | 10/2004 | Bates et al. |
| 6,978,292 B1 | 12/2005 | Murakami et al. |
| 2002/0059258 A1 | 5/2002 | Kirkpatrick |

OTHER PUBLICATIONS

Web site describing CyberSleuth retrieved from [URL:http://www.interesting-people.org/archives/interesting-people/200006/msg00090.html] on Jan. 21, 2005, dated Jun. 29, 2000.

NetCurrent's web site, retrieved from [URL: http://web.archive.org/web/20000622024845/www.netcurrents.com] on Jan. 17, 2005, archived on Jun. 22, 2000 and Sep. 18, 2000.

Trigaux, Robert. "Cyberwar Erupts Over Free Speech Across Florida, Nation." Knight-Ridder Tribune Business News, May 29, 2000.

Kahn et al., Categorizing Web Documents using Competitive Learning: An Ingrediant of a Personal Adaptive Agent, IEEE; c 1997.

Nakashima et al., Information Filtering for the Newspaper, IEEE; c 1997.

* cited by examiner

SYSTEM AND METHOD FOR COLLECTION AND ANALYSIS OF ELECTRONIC DISCUSSION MESSAGES

CROSS-REFERENCE TO RELATED APPLICATIONS

This application is a divisional of U.S. patent application Ser. No. 09/686,516, filed Oct. 11, 2000, the disclosure of which is incorporated herein by reference.

BACKGROUND

1. Field of the Invention

The present invention relates generally to data collection, organization and analysis and morn particularly, the present invention relates to collection, categorization and analysis of electronic discussion messages.

2. Background of the Invention

Electronic discussion forums have been used in the art to facilitate communications between two or more people. Such electronic discussion forums typically allow for exchange of information, ideas and opinions over an extended period of time, i.e., a discussion about a particular topic may be initiated by an individual posting a message on day one, and subsequent discussion participants may receive, view or respond to the message at a later date. Such discussion forums allow even participants new to the forum to review past discussion messages and therefore to fully participate in the forum. Well-known examples of such electronic forums include Web-based and proprietary message boards (both public and private), USENET news groups, and electronic mailing lists. These electronic discussion forums support both synchronous and asynchronous discussions, i.e., one or more participants may inject communications into the discussion at the same time, or nearly the same time, without disrupting the flow of communications. This allows each individual electronic discussion forum to be rich with communications spanning a wide variety of topics and subjects.

Other electronic discussion forums, such as interactive chat sessions, facilitate more traditional asynchronous-like communications. In these discussion forums, participants are typically online at the same time and are actively responding to messages posted by others. These discussion forums are similar to a traditional telephone discussion in that the information in exchanged in real-tune. However, a significant difference is that the electronic discussion forums are, by their nature, written or recorded message transmissions which may be saved for historical records or for analysis at a future date.

The wide-spread growth of the Internet has spurred numerous electronic communities, each providing numerous discussion forums dedicated to nearly any conceivable topic for discussion. The participants in a particular discussion may be geographically dispersed with worldwide representation or may be primarily localized, depending on the topic or distribution of the four. For example, a mailing list devoted to planning for city parks in New York City may be only of interest to people having strong ties to the city or region, while a message board devoted to a particular programming language may have participants spanning the globe.

With so many different topics and subjects within each topic, and so many participants, a significant problem arises in attempting to capture and quantify the communications. Moreover, identifying trends and predicting future behavior in certain markets based on the communications has not been possible in the past because of the magnitude of the communications and the magnitude of topics and subjects. Further complicating any analysis of communications in electronic discussion forms is the fact that an individual may easily participate in multiple forums by posting the same message in several different discussion forums, and that individuals may use more than one identity when posting.

SUMMARY OF THE INVENTION

The system and method of the present invention allows collection and analysis of electronic discussion messages to quantify and identify trends in various markets. Message information data is collected and becomes a time series stored in a database, indicating the identity or pseudonym of the person posting the message, the contents of the message and other data associated with the message. This data is analyzed to identify when new participants enter and leave the discussion and how often they participate. Calculation of summary statistics describing each community's behavior over time can also be made. Finally, identification of patterns in this data allows identification of pseudonyms who play various roles in each community, as described below.

The system of the present invention comprises an electronic discussion data system, a central data store and a data analysis system. The electronic discussion data system may comprise a message collection subsystem as well as message categorization and opinion rating subsystems. The message collection subsystem interfaces with a plurality of pre-determined electronic discussion forums to gather message information. The message categorization subsystem analyzes the message information and categorizes each message according to a plurality of pre-determined rules. The opinion rating subsystem further analyzes the message information and assesses an opinion rating according to a plurality of pre-determined linguistic and associative rules. The central data store of the present invention comprises one or more nonvolatile memory devices for storing electronic data including, for example, message information, results of analyses performed by the system and a plurality of other information used in the present invention. In a preferred embodiment, the central data store further comprises a relational database system for storing the information in the non-volatile memory devices. The data analysis system of the present invention may comprise an objective data collection subsystem, an analysis subsystem, and a report generation subsystem. The objective data collection subsystem interfaces with a plurality of pre-determined objective data sources to collect data which may be used to establish trends and correlation between real-world events and the communication expressed in the various electronic discussion forums. The analysis subsystem performs the analysis of the objective data and message information described above. The report generation subsystem generates reports of the analysis to end-users. The reports—may comprise pre-determined query results presented in pre-defined report formats or, alternatively may comprise ad hoc reports based on queries input by an end-user.

The method of the present invention comprises one or more of the steps of collecting a plurality of message information from a plurality of pre-determined electronic discussion forums; storing the plurality of message information in a central data store; categorizing the message information according to a plurality of pre-determined rules; assigning an opinion rating to the plurality of message information based on a plurality of pre-determined linguistic patterns and associative rules; collecting a plurality of objective data from a plurality of objective data sources; analyzing the message information and the objective data to identify trends in the pattern of behavior in pre-determined markets and the roles of participants in electronic discussion forums; and generating reports for end-users based on the results of the analyses performed by the present invention.

DEFINITIONS

Figure 1:
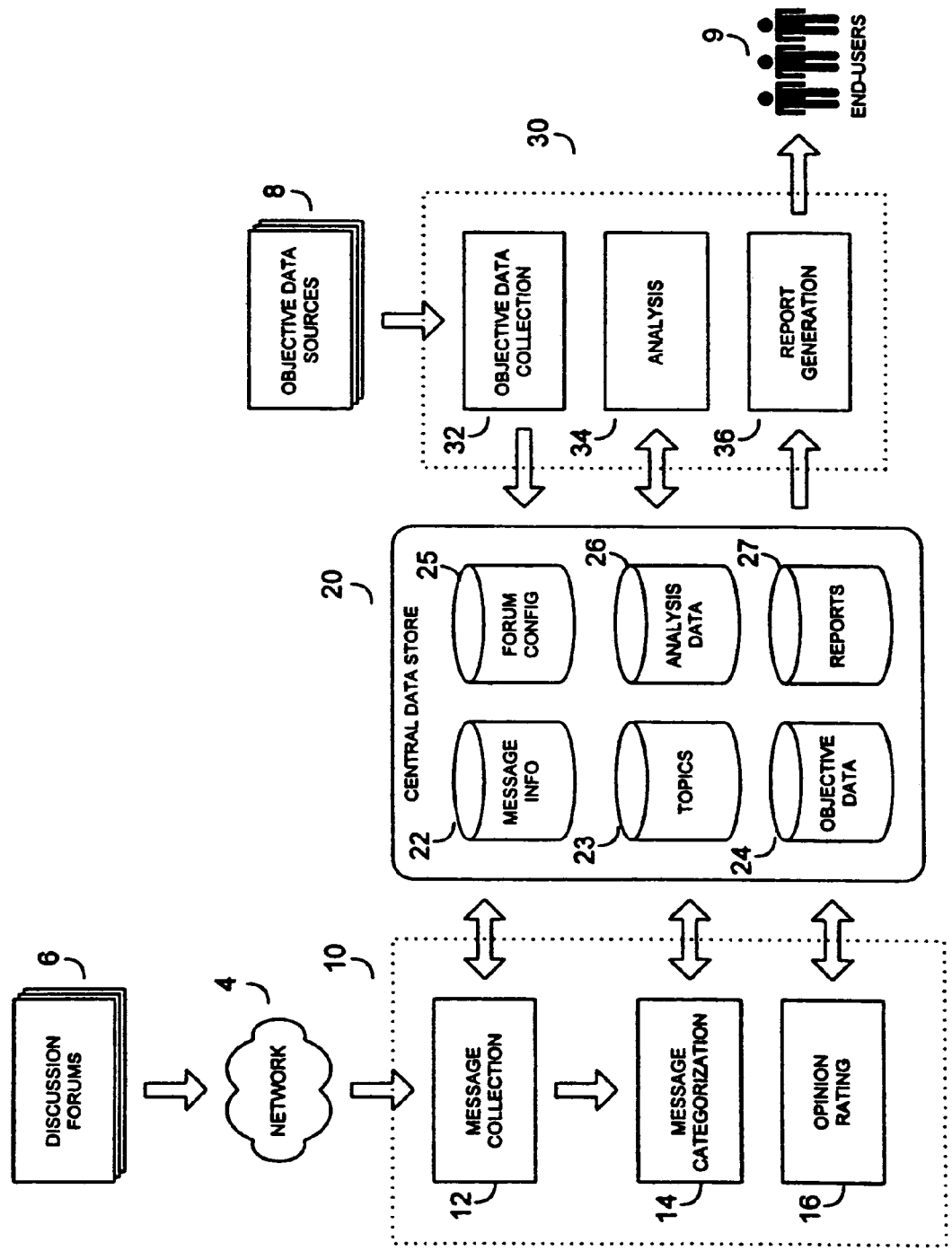
FIG. 1 is a schematic diagram of the system architecture employed in a preferred embodiment of the present invention.

Community—a vehicle supporting one or more electronic discussions, such as a message board, mailing list, or Usenet newsgroup.

Discussion Forum—an area of a community where discussions directed to a particular theme occur. Examples of discussion forums include Amazon message board on Yahoo Message Boards and the Usenet newsgroup rec.arts.movies.current-films.

Message—the text and associated information posted to discussion forums, also referred to herein as "electronic message".

Topics—the themes designated for discussion in a discussion forum by a particular community.

Subject—the contents of the "Subject" field in an electronic message posted in an electronic discussion (as distinct from topics).

Pseudonym—an e-mail address, alias, or other name used by a participant in an electronic discussion forum. A pseudonym is an end-user's identity in a particular community.

Source—the issuer of a pseudonym, such as an e-mail host.

Message Body—the portion of an electronic message comprising the pseudonym's contribution to the electronic discussion. "The Message Body—generally comprises the data, opinions' or, other information conveyed in the electronic message, including attached documents or files.

Header Information—the portion of an electronic message not including the message body. Header Information generally comprises the transmission path and time/date stamp information, the message sender's information, the message identification number ("message ID"), the subject.

Buzz Level—for a community, a measure of activity within the community, as determined by the number of distinct pseudonyms posting one or more messages over a given time frame.

Connectivity—for a community, a measure of its relatedness with other communities, as determined by the number of other communities in which a community's participants concurrently participate.

Actor—descriptive name of the role that a pseudonym plays in the social networks of communities. Actors can be further classified according to the following definitions:

Initiator—a pseudonym that commences a discussion, i.e., one that posts the first message leading to subsequent responses forming a dialog on a particular subject.

Moderator—a pseudonym that ends a discussion, i.e., one that posts the final message closing the dialog on a particular subject.

Buzz Accelerator—a pseudonym whose postings tend to precede a rising buzz level in a community.

Buzz Decelerator—a pseudonym whose postings tend to precede a falling buzz level in a community.

Provoker—a pseudonym that tends to start longer discussion threads; different from buzz accelerators in that the metric is one discussion thread, not the community's overall discussion level.

Buy Signaler—a pseudonym whose postings on a topic tend to precede a rising market for that topic.

Sell Signaler—a pseudonym whose postings on a topic tend to precede a falling market for that topic.

Manipulator—a pseudonym with little posting history except as Manipulators, whose combined postings on one topic elevate the buzz level in the absence of external confirming events.

Connector—a pseudonym who posts on a high number of topics or a high number of communities.

Market Mood—a positive/negative market forecast derived from analysis of the patterns of actors' behavior.

DETAILED DESCRIPTION

In a preferred embodiment, the present invention is implemented using a system architecture as shown in FIG. 1. The system architecture comprises electronic discussion data system 10, central data store 20, and analysis system 30. Electronic discussion data system 10 interfaces via network 4 with selected electronic discussion forums 6 to collect electronic messages and analyze intrinsic data comprising the messages according to one aspect of the present invention. Network 4 may be any communications network, e.g., the Internet or a private intranet, and may use any suitable protocol for the exchange of electronic data, e.g., TCP/IP, NNTP, HTTP, etc. Central data store 20 is a repository for electronic messages collected, objective data gathered from external sources and the results of the various analyses or reports produced by the system and method of the present invention. Central data store 20 may be implemented using any suitable relational database application program, such as, e.g., oracle, Sybase and the like. Data analysis system 30 receives input from selected objective data sources for use in analyzing and quantifying the importance of the electronic discussion messages collected, and provides computer programming routines allowing end-users 9 to generate a variety of predefined and ad hoc reports and graphical analyses related to the electronic discussion messages. Each of the main systems comprising the system architecture of the present invention is described in more detail below.

Central Data Store

Central data store 20 comprises one or more database files stored on one or more computer systems. In a preferred embodiment, central data store 20 comprises message information database 22, topics database 23, objective data database 24, forum configuration database 25, analysis database 26 and reports database 27, as shown in FIG. 1. Message information database 22 comprises the message information collected by message collection subsystem 12. In a preferred embodiment, message information database 22 comprises: a, message ID, i.e., a number or other string that uniquely identifies each message; sender information, i.e., the pseudonym, e-mail address or name of each message's author, a posting time and date for each message (localized to a common time zone); a collection time and date for each message; a subject field, i.e., the name of the thread or subject of each message; the message body for each message; an in-reply-to field, i.e., the message ID of the message to which each message was a reply; and the source of the message.

The function and content of central data store 20's database files 23–27 are described in subsequent sections below.

Electronic Discussion Data System

As discussed above, electronic discussion data system 10 gathers certain messages and analyses them according to the intrinsic information comprising the messages. Electronic discussion data system 10 comprises three subsystems: message collection subsystem 12, message categorization subsystem 14 and opinion rating subsystem 16. Message collection subsystem 12 collects message information from data sources and stores the information in central data store 20 for later analysis. Message categorization subsystem 14 extracts information about each message in central data store 20 and categorizes the messages according to a plurality of pre-defined topics. The subsystem analyzes all aspects of each message and determines if the message is relevant to one or more of the topics that the system is currently tracking. A relevancy ranking for each message is stored in central data store 20 for each topic indicating the strength of the message's relation to each topic. Further analysis of the collected message information is carried out by opinion rating subsystem 16 to determine whether the message conveys a positive, neutral or negative opinion regarding the related topic. Each of the subsystems of electronic discussion data system 10 are described in more detail below.

1. Message Collection Subsystem

Figure 2:
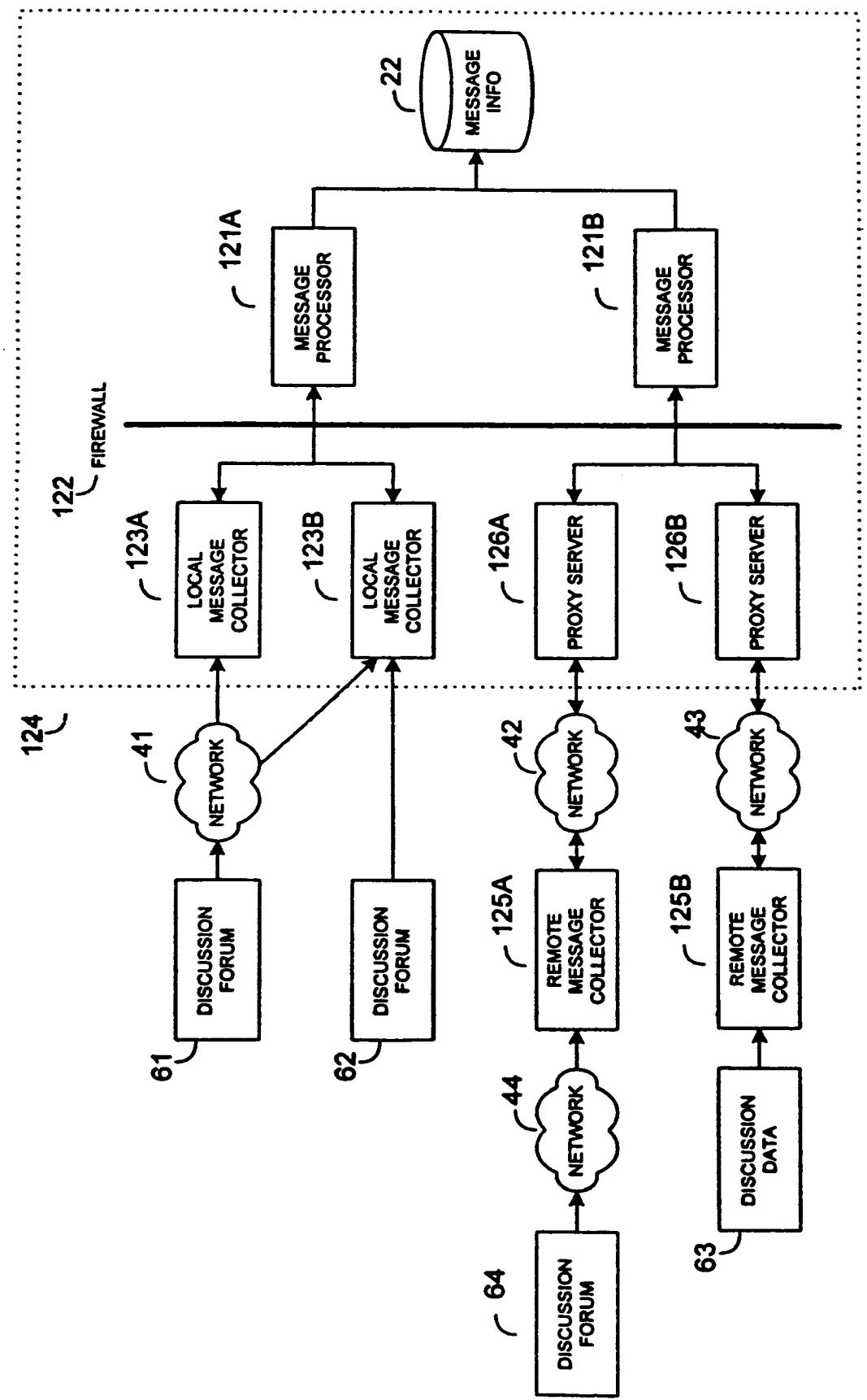
FIG. 2 is a schematic diagram of a message collection subsystem implemented in a preferred embodiment of the present invention.

Message collection subsystem 12 collects electronic message information from the designated electronic discussion forums and passes the collected messages to central data store 20 and to message categorization subsystem 14, as shown in FIG. 1. The collected messages comprise records stored in message information database 22 in central data store 20. Database 22 comprises records including message header information and the message body. In a preferred embodiment, each field comprising message header information comprises a separate field of a record in database 22. The architecture used in a preferred embodiment of the present invention for implementing message collection subsystem 12 is shown in the schematic diagram in FIG. 2. This architecture supports multiple configurations for data collection and is highly scalable for gathering large or small amounts of message information. FIG. 2 illustrates some of the configurations that may be used in a preferred embodiment of message collection subsystem 12.

As shown in FIG. 2, the message collection subsystem consists of several components that function together to collect information from electronic discussion forums 61 and 62 or discussion data files 63 and 64 on distributed networks 41–44. Although shown as separate discussion forums, data files and networks, it would be apparent to one skilled in the art that discussion forums 61 and 63 and data files 63 and 64 could be the same discussion forum or data file, and networks 41–44 could comprise a single distributed network, such as the Internet. Components of message collection subsystem 12 include message collector programs and message processor programs running on one or more computer systems. The computer systems used by message collection subsystem 12 comprise any suitable computers having sufficient processing capabilities, volatile and non-volatile memory, and support for multiple communications protocols. In a preferred embodiment, the computer systems used by message collection subsystem 12 comprise UNIX-based servers such as available from Sun Microsystems, or Hewlett-Packard and the like. All of the subsystem components can be replicated within a single computer system or across multiple computer systems for overall system scalability.

In a preferred embodiment, message processor programs, e.g., message processor 121*a* and 121*b*, are in communication with database 22, which is part of central data store 20 (not shown in FIG. 2). In FIG. 2, the message processors and central data store are protected from unauthorized access by firewall security system 122. Other components of message collection subsystem 10 are located at various points in the architecture, as described below. As would be apparent to one of ordinary skill in the art, firewall 122 is provided for security and is not technologically required for operation of the present invention. Message processors 121*a* and 121*b* receive information from the message collectors and store the information in the database 22 for later processing. As shown in FIG. 2, message processors 121*a* and 121*b* may service more than one message collector program to facilitate processing of a large volume of incoming messages. Inbound messages are held in a queue on the message processors, allowing message processors 121*a* and 121*b* to receive many more messages from the message collectors than they can actually process for storing in database 22. This architecture allows the rapid collection of millions of messages from tens of thousands of discussion forums without excessive overloading of the computer systems.

As is known in the art, each discussion forum or data file may have a unique message format. For example, an electronic message from one discussion forum may place the date field first, the message ID second, and the other header and body data last. A different discussion forum may choose to display the message ID first, followed by the pseudonym of the participant, and the message body. Moreover, each type of discussion forum has its own communications protocol. For example, the communications protocol for an interactive discussion forum (e.g., a chat session) is not the same as the communications protocol for USENET news groups. The message format and protocols need not be static, i.e., as discussion forums evolve, different data structures and protocols may be implemented. To accommodate such changes, each message collector receives configuration information from forum configuration database 25 in central data store 20, either directly or via the message processor systems. The configuration information indicates the data source, i.e., the discussion forum or discussion file, from which messages will be collected. The configuration information further comprises programming instructions tailored for each individual data source to allow the message collector program to communicate with the data source and extract and parse the message information. Accordingly, message collectors can support a wide variety of protocols utilized by discussion forums including, e.g., HTTP, NNTP, IRC, SMTP and direct file access. In a preferred embodiment, the general programming instructions are written the Java programming language with parsing instructions written in Jpython scripting language. By storing the configuration information in a centralized location, i.e., central data store 20, management of the message collectors is simplified. Accordingly, when the data structure for a particular discussion forum changes, the configuration information needs to be modified only once.

To ensure compatibility with various computer systems, the message collector programs are written utilizing any suitable programming languages, preferably Java and Python scripting languages. This allows the collector programs to be easily ported across a wide variety of computer operating systems. Moreover, the message collector programs are designed to have a minimal processing footprint so that they can reside on computer systems that are hosting other critical functions.

As noted above, there are several ways to implement the architecture supporting message collection subsystem 12. In one implementation, message collector programs, shown in FIG. 2 as local message collectors 123a and 123b, are part of local area network ("LAN") 124 and are authorized access through firewall 122. Local message collector 123a interfaces through network 41 to collect messages from discussion forum 61 and local message collector 123b has direct access to discussion data file 63. The latter configuration may be implemented, e.g., if the operator of message collection subsystem 12 also hosts a community for message discussion forums. As shown in FIG. 2, a message collector may collect messages—from multiple discussion forums. For example, as shown in FIG. 2, local message collector 123b also interfaces through network 41 to collect messages from discussion forum 61.

In an alternative implementation, message collector programs, such as remote message collectors 125a and 125b, are run on external networks. As shown in FIG. 2, the remote message collectors are not part of LAN 124 and do not have direct access to the message processor programs running behind firewall 122. For security reasons, proxy servers 126a and 126b are used to interface with message processor 121b through firewall 122. Functionally, remote message collectors operate in the same manner as the local message collectors. That is, remote message collectors 125a and 125b receive configuration information from central data store 20 (via proxy servers 126a and 126b, respectively). Moreover, remote message collectors may collect messages from discussion forums over a network or directly from discussion data files, as shown in FIG. 2. Use of remote message collectors allows for geographic distribution and redundancy in the overall message collection subsystem architecture.

2. Message Categorization Subsystem

Message categorization subsystem 14 analyzes the data collected from discussion forums and categorizes the messages into meaningful groupings, i.e., parent topics and topics, according to predefined rules as described below. In a preferred embodiment, message categorization subsystem 14 retrieves message information from database 22 and topic information from central data store 20 and stores results of the categorization process in database 22. Alternatively, message categorization subsystem 14 may receive input directly from message collection subsystem 12 for immediate processing into categories.

Figure 3:
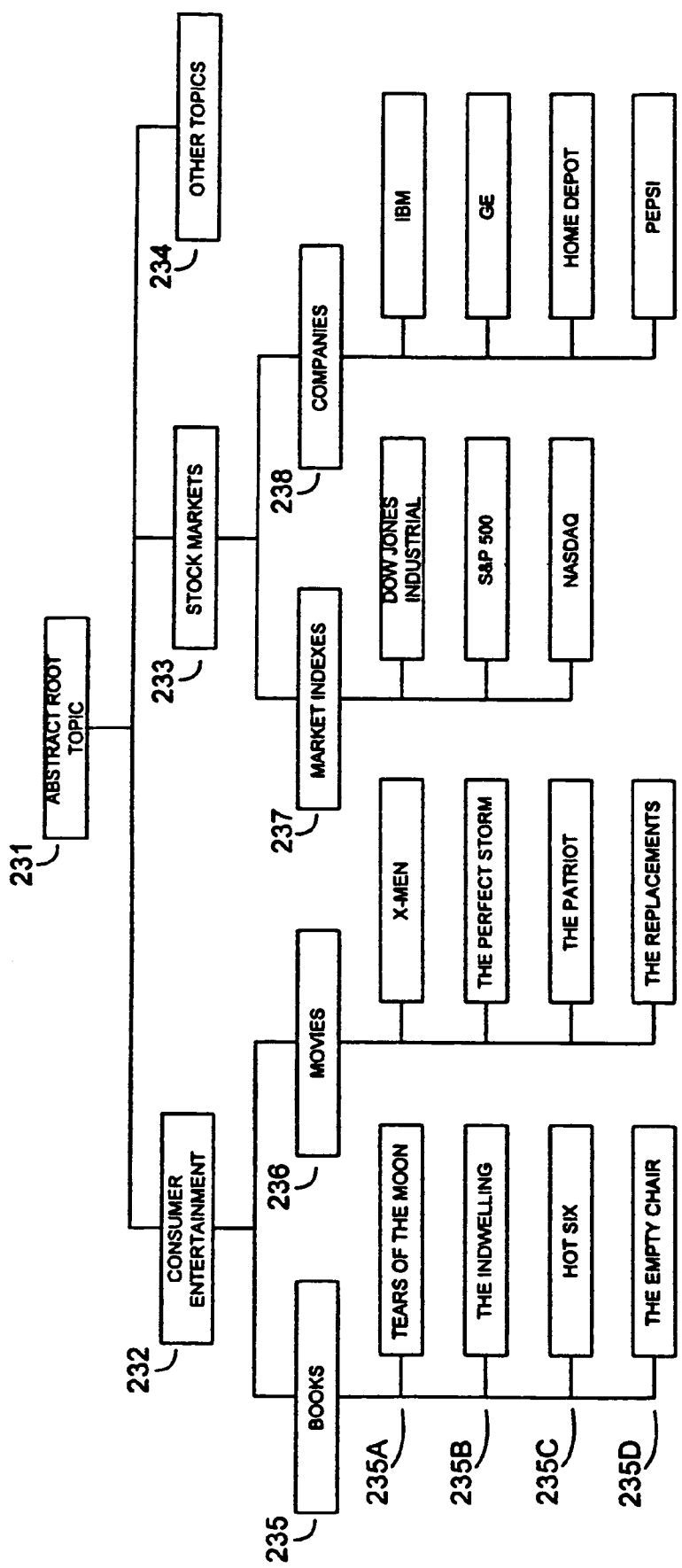
FIG. 3 is a schematic diagram of the hierarchy used to categorize messages in a preferred embodiment of the present invention.

Topics database 23 comprises representations of real world topics that are being tracked and analyzed by the system and method of the present invention. FIG. 3 shows the hierarchical data structure used in a preferred embodiment of database 23. In a preferred embodiment, abstract root 231, shown in FIG. 3 as the top-level of the hierarchy, is not an actual topic stored in database 23 and is shown only to illustrate the hierarchy. Similarly, branches 232–234 are shown in FIG. 3 to conceptually show the relationship between topics stored in database 23. Accordingly, branch 232 indicates that some topics stored in database 23 may relate consumer entertainment, branch 233 indicates other topics relate to stock markets, and branch 234 may include other topics, such as, e.g., food, sports, technology adoption, and the like. As shown in FIG. 3, the hierarchy comprises one or more parent topics, such as parent topics 235 (related to books), parent topic 236 (related to movies), parent topic 237 (related to market indexes) and parent topic 238 (related to companies). Topics in the hierarchy are the last level, such as, topic 235a (Tears of the Moon), topic 235b (The Indwelling), topic 235c (Hot Six) and topic 235d (The Empty Chair). As shown in FIG. 2, topics 235a–235d are related to each other by parent topic 235 (books).

In a preferred embodiment of the present invention, message categorization subsystem 14 assigns a relevance ranking for each topic to each message collected by message collection subsystem 12. The relevance ranking is determined based on a set of predefined rules stored in database 23 for each topic. The rules comprise a series of conditions defining information relevant to the topic, having an associated weighting to indicate the strength a particular condition should have in determining the overall relevance rank of the message with respect to the topic. Messages that need categorization are processed by message categorization subsystem 14 synchronously, i.e., the rules for each topic are applied to each message regardless of the relevance ranking for prior topics. The elements of each message, including subject, source, and content are processed against the conditions of each topic in the database. Based on the conditions that are satisfied and the weights of those conditions, a relevance rank for each topic is assigned to each message. As messages are processed, their relevance ranking for each topic is updated in message information database 22 in central data store 20.

An example of the rules which may be processed by message categorization subsystem 14 is presented in Table 1, below. In this example, the topic is "The Perfect Storm" which, as shown in FIG. 3, is under the parent topic "Movies". The conditions for determining the relevance ranking for each message are shown in Table 1, below.

TABLE 1

| Condition | Weight |
| --- | --- |
| Message originated from Yahoo movies discussion forum | 10 |
| Message subject contains "The Perfect Storm" | 90 |
| Message subject contains "Perfect Storm" | 80 |
| Message body contains "The Perfect Storm" | 50 |
| Message body contains "The Perfect Storm" and "George Clooney" | 90 |
| Message body contains "Warner Brothers" and "Barry Levinson" | 75 |

The number, nature, and weights for conditions used to determine the relevancy ranking for each topic depends on the nature of the topic itself. The accuracy of the relevancy ranking assigned can be increased by refining the conditions and weights after analysis of the results obtained by the system. For example, analysis of the results in the above example may show that an additional condition, such as "Message originated from Yahoo movie discussion forum and message subject contains "Perfect Storm"" should be included in the rules and have a weight of 99. If subsequent analysis provides refined rules, message categorization subsystem 14 may be re-nun against each message in database 22 to update the relevancy rankings, if desired.

3. Opinion Rating Subsystem

Opinion rating subsystem 16 extracts message information from database 22 in central data store 20 and assigns an opinion rating for each message by analyzing textual patterns in the message that may express an opinion. The textual patterns are based on linguistic analysis of the message information. For example, if the message body includes words such as "movie" and "awful" in the same sentence or phrase and the message had a high relevancy ranking for the topic "The Perfect Storm" the message may be expressing a negative opinion about the movie. Textual pattern analysis software, such as available from Verity Inc, of Mountain View, Calif., may be used to assign the opinion rating for each message. Such passive opinion polling is useful for market analysis without the need for individually interviewing active participants in a survey. Once the rating process is complete, the rating for each opinion processed is stored in database 22 in central data store 20.

Data Analysis System

Data analysis system 30 comprises objective data collection subsystem 32, analysis subsystem 34 and report generation subsystem 36, as shown in FIG. 1. The overall goal of data analysis system 30 is to identify and predict trends in actual markets based on the electronic discussion data being posted to various electronic discussion forums and to provide reports for end-users 9 of the system and method of the present invention.

1. Objective Data Collection Subsystem

Objective data collection subsystem 32 collects objective data from both traditional and electronic sources and stores the information in database 24 on central data store 20 for later analysis. Objective data sources 8, shown in FIG. 1, may include for example, market data such box office sales for recently released movies, stock market activity for a given period, television viewer market share (such as Nielson ratings), and other such objective data. The specific data collected from each objective data source depends on the nature of the market being analyzed. For example, objective data on the stock market may include: a company's name; its Web home page address, i.e., universal resource locator; ticker symbol; trading date; opening price; high price; low price; closing price and volume. In other markets, the objective data may include: sales, measured in units sold and/or revenue generated; attendance at events; downloads of related software and media files; press release date, time and key words; news event date; and the like. The objective data is used by analysis subsystem 34 to identify and predict trends and correlation between real world events and electronic discussion data, as described below.

2. Analysis Subsystem

Analysis subsystem 34 performs analysis of the information collected by the message collection subsystem 12 and objective data collection subsystem 32, and the categorization and opinion information determined by message categorization subsystem 14 and opinion rating subsystem 16, respectively. Analysis subsystem 34 determines the existence of any correlation between discussion forum postings and market activity for each topic that the system is currently tracking. The results of the analysis are stored in the analysis database 26 in central data store 20 for eventual presentation to end-users 9. Analysis subsystem 34 examines the internal behavior of communities and correlates individual and group behavior to the world external to the communities using a variety of analysis techniques with a variety of goals. Analysis subsystem 34 identifies and categorizes actors by measuring the community's response to their postings; measures and categorizes the community's mood; correlates actors' behavior and the communities' moods with objective data sources; and forecasts the markets' behavior, with confidence estimates in various timeframes. Identifying and tracking both the actors and the community mood is important, because the effect of an actor's message depends in part on the mood of the community. For example, an already-nervous community may turn very negative if a buy signaler or other negative actor posts a message, while the same message from the same person may have little effect on a community in a positive mood. The following sections describe the patterns sought in the analysis and describes how the community behaves after postings each local pseudonym associated with the patterns.

(a) Actor Classification

Actors are classified by correlating their postings with objective data, which is external to the electronic forum. Changes in the objective data (e.g., stock price changes, increased book sales, etc.) are tracked during several discrete short time periods throughout a longer time period, such as day. A score is assigned to each pseudonym posting messages related to a given topic based on the change observed in the objective data from the preceding discrete time period. A pseudonym's score may be high, medium or low, depending on the magnitude of the change. For example, in a preferred embodiment, pseudonyms who tended to post messages just prior to major increases in stock price, receive a high positive scores; while those whose postings tended to precede major drops have the lowest negative scores. The scores assigned to a pseudonym during the longer time period are aggregated into a composite score for the pseudonym.

As discussed in the definitions sections above, actors can be classified as an initiator if the actor tends to post the first message leading to subsequent responses forming a dialog on a particular subject. Similarly, an actor tending to post the final message closing the dialog on a particular subject is classified as a moderator.

Two of the more interesting classifications made by analysis subsystem 34 identify buzz accelerators and buzz decelerators. Because of the correlation identified in some markets between the level of discussion in a community and the objective, real-world events, identification of buzz accelerators and decelerators can be used to predict the probable outcome of real-world events. For example, if a local pseudonym were identified as a buzz accelerator for electronic discussion forums related to the stock market, whenever that local pseudonym posts a message to such a forum, one would expect a rise in the discussion level, and the correlating drop in stock prices. Related, but not synonymous, classes of actors are buy signalers and sell signalers. Such actors tend to post messages at a time preceding a rising or falling market for that topic In contrast to buzz accelerators or decelerators, buy and sell signalers do not necessarily tend to reflect or precede rising levels of electronic discussion on the forums.

The final three classes of local pseudonyms are manipulators, provokers and connectors. As noted in the definition sections, a manipulator is a local pseudonym with little posting history except as manipulators, whose combined postings on one topic elevate the buzz level in the absence of external confirming events. Such actors may be attempting to obscure analysis or to sway the markets being analyzed. As such, identifying and tracking manipulators is important for ensuring validity of the results output by analysis subsystem 34. Provokers are local pseudonyms that tend to start longer discussion threads, which may contribute to a community's overall discussion level, but is not indicative of a rise in discussion level for the community. Again, identification and tracking of provokers allows better results in the analysis of electronic discussion information. Finally, a connector is a local pseudonym that posts on a high number of topics or a high number of communities.

Figure 4:
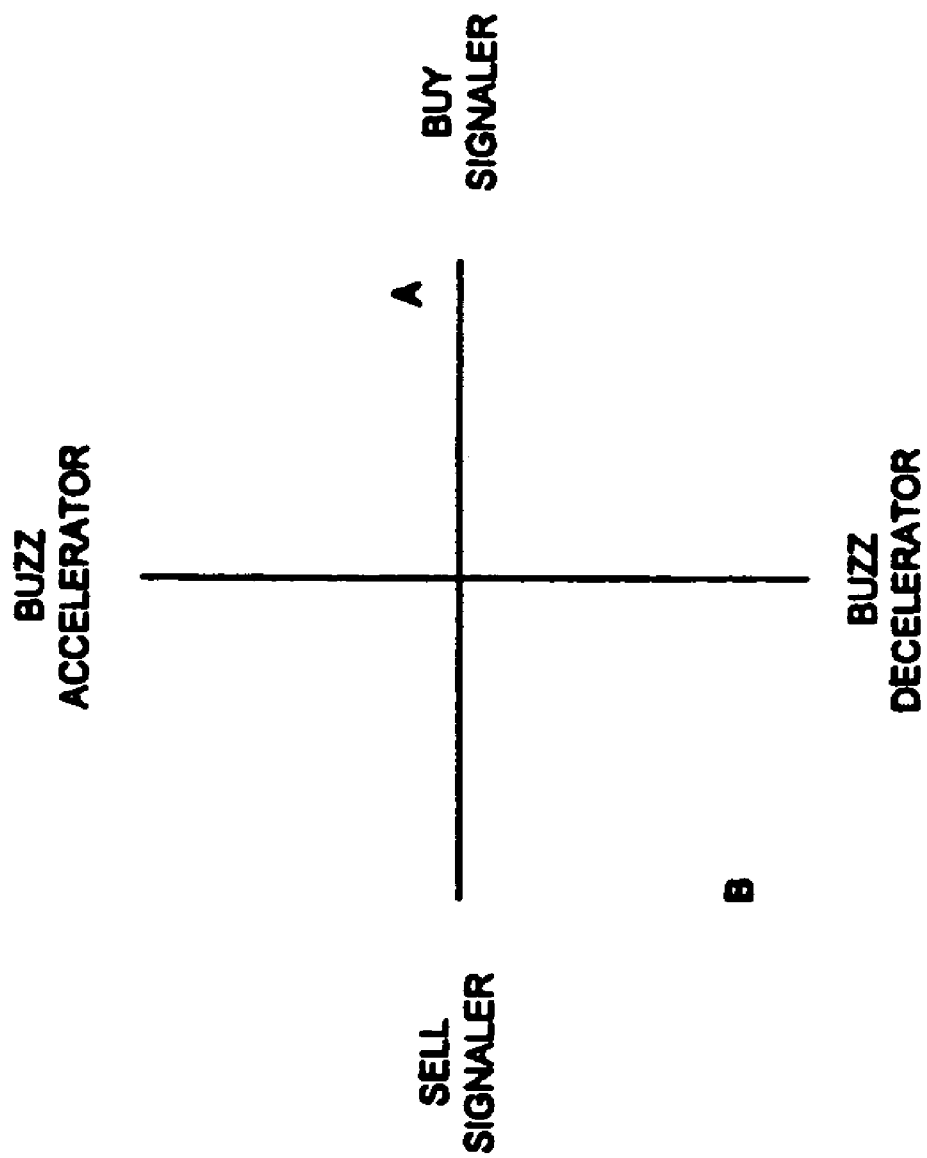
FIG. 4 is an example of graphical report output by a report generation subsystem of the present invention.

Analysis subsystem 34 tracks and observes the behavior characteristic of the pseudonyms posting messages to electronic discussion forums and assigns a reputation score indicating their categorization. In a preferred embodiment, the reputation score comprises an array of ratings for each of the possible categorizations. From the reputation score, composite views of the tendencies of the pseudonyms can be formed to graphically illustrate the pseudonym's reputation in a given community. An example of one such composite view is shown in FIG. 4, wherein a pseudonym's reputation as a buzz accelerator/decelerator is plotted against its reputation as a buy/seller signaler. As shown in FIG. 4, pseudonym A has a strong tendency as a buy signaler and is a buzz accelerator, but not a strong buzz accelerator. In contrast, pseudonym B has strong tendencies as both a sell signaler and a buzz decelerator in the market. The impact of the classifications depends, of course on the market involved, as discussed previously.

(b) Community Mood

As discussed above, pseudonym's classifications are useful to the extent they can quantify the tendencies of the various actors in a community. However, the impact of such actors on the community depends not only on the tendencies of the actors, but on the overall mood of the community. The measure of a community's mood is determined from the change in discussion levels in the community. The mood assigned is based on observed trends for the associated topic. For example, when discussion levels rise in stock market forums, the rise is usually accompanied by a drop in stock market prices due to increased selling activity, indicating a negative mood in the community. Similarly, an increase in discussion levels for a movie topic may indicate a generally positive mood for the community. Other indicators of community mood include the number of new participants in a community, which correlates to an increased interest in the community's topic. Moreover, the combined positive and negative influence scores of actors in a community is an indicator of the its overall sentiment. Another factor indicating a community's mood is its turnover rate, i.e., the number of new participants versus the number of old participants, indicates the depth of interest in the community's topic.

The combined provocation-moderation scores of active participants is expected to be a forecaster of the community's discussion near-term discussion level.

The ratio of message volume to external volume (stock trading volume in the prototype) will be explored as an indicator of confidence for other forecasts.

The number of active discussion threads, relative to the number of participants, is an indicator whose significance we plan to explore. "Flame wars," for example, are typically carried out by a small number of people generating a large volume of messages.

The ratio of "on-topic" to "off-topic" messages, which we expect to be able to measure via linguistic analysis, is an indicator whose significance we plan to explore.

Co-occurrence of topics within a community, also measurable via linguistic analysis, is an indicator of shared interests among communities, whose significance we plan to explore.

(c) Algorithms and Modeling

As discussed above, the analysis system uses patterns in message postings to identify community moods and opinion leaders, i.e., those pseudonyms whose postings can be correlated to changes in the market and/or forum discussion levels. Linguistic analysis extends this analysis by showing and summarizing the subjects under discussion and reveals attitudes toward the topics discussed. The linguistic analysis used in the present invention is not intended to explicitly identify any individual's attitude toward a given topic; rather the overall attitude of the community is assessed.

The analysis system relies on the inherent repeated patterns in discussions that yield accurate short-term forecasts. The existence of such repeated patterns is known in the art, and can be explained with reference to three areas of research into social networks. Chaos and complexity theories have demonstrated that large numbers of agents, each of whom interacts with a few others, give rise to repeating patterns by virtue of simple mathematics. Social network theory grounds mathematical models in human behavior. Computer-mediated communications research applies the mathematical models to "new media" technologies including the Internet.

As with any high-frequency, high-volume data mining challenge, the number of potential variables is enormous and the applicable techniques are many. To simplify this problem, the system and method of the present invention reduces the data sets as much as possible before analysis. Accordingly, on the assumption that there are a very small number of opinion leaders relative to participants, the vast majority of participants whose postings did not occur near objective data inflection points, i.e., sharp changes in the objective data, are eliminated. This greatly reduces the amount of data that is further analyzed by the system and method of the present invention. The period of time over which inflection points are identified has a great impact on which patterns can be identified and usefulness of the resulting data. For example, stock price movement and other markets are known to have fractal patterns, so they have different inflection points depending on the time frame chosen. Accordingly, different inflection points will be identified if the period is weekly, monthly, or yearly. The more volatile a market is, the more inflection points can be found.

The following sections describe the various types of analyses used in a preferred embodiment of analysis subsystem 34.

Statistical Analysis

Histograms divide scores into "bins" that show the distribution across the range of values. Histograms of the positive/negative influence scores, as well as the provoker/moderator scores described above, are used to select statistically significant pseudonyms at the outlying ends of the normal distribution curve. A database query can then calculate the ratio of these opinion leaders who have posted in the last X days. For example, if 25 of the top 50 "positives" and 10 of the top 50 "negatives" posted in the last two days, the ratio would be 2.5, indicating that positive market movement is more likely than negative.

Fourier Analysis

Fourier analysis is a well-established technique, with many variations, for breaking down a complex waveform, such as plots of discussion levels, into component waves.

This makes it possible to subtract regularly occurring waves, such as increased or decreased discussion levels on weekends, in order to isolate the movements that signal meaningful events.

On Balance Volume

On Balance Volume (OBV) uses stock trading volume and price to quantify the level of buying and selling in a security. In a preferred embodiment of the present invention, OBV is used, e.g., by substituting the number of discussion participants for the stock volume. In this context, OBV is a negative indicator, i.e., when it is rising, price tends to fall; when it falls, price tends to rise.

Moving Average Convergence-Divergence

Moving Average Convergence-Divergence (MACD) is a technical analysis that may be applied to the discussion levels in the communities. MACD generates signals by comparing short term and long-term moving averages; the points at which they cross one another can be buy or sell signals, depending on their directions. MACD can signal when a community's discussion level rises above the recent averages, which is often an indicator of rising nervousness.

Link Analysis

In one embodiment of the present invention an "80/20 rule," supported by social network research, is used wherein only the 20 percent of participants whose posts are "closest" (in time) to significant objective data inflection points are analyzed. While this method simplifies the task of analyzing the data, there is some risk that opinion-leading groups may be overlooked. Such groups comprise individuals that do not consistently post at the same time, but as a group exhibit the characteristics of individual opinion leaders. For example, it is possible Bob, Sam and George form a positive opinion leader group, i.e., when any one of them posts a message, prices tend to rise. Data mining link analysis tools are used to explore for these kinds of relationship and to identify groups of pseudonyms whose behavior as a group exhibits predictive patterns.

Geographic Visualization

Tools for geographic visualization display the distribution of information on a map. Although geographic location is unknown for many of the pseudonyms being monitoring, it is available for some of them and will be tracked as the information becomes available. This analysis allows monitoring of the awareness of a topic, such as a newly released consumer media device, as it spreads throughout the United States and other countries. This analysis will help marketers decide where promotional and advertising budgets can be spent most effectively. Marketing experience and the mathematics of social networks predict that awareness follows a stair-step pattern. The analysis results of the present invention can be used to identify these plateaus very early, allowing marketers to cut spending earlier than they otherwise would.

Clustering

Cluster analysis allows discovery of groups of local pseudonyms that "travel in the same circles." For example, there may be a group of 20 local pseudonyms that tend to participate in discussions on five topics. This cluster of shared interests is a means of automatically discovering that there is some kind of relationship among the five topics. In the financial market, it implies that people who are interested in any one of the five companies are likely to find the other four interesting. Presenting these as recommendations is a form of collaborative filtering, because it helps the user select a few new topics of interest out of thousands of possibilities. The most significant aspect of this analysis is that the computer system needs no knowledge of why the topics are related; the system can therefore discover new relationships.

Regression

Regression analysis is a well-known method of correlating sets of data. Regression is the most fundamental means for identifying if the patterns in communities have a positive, negative or insignificant correlation to external events.

Neural Networks and Genetic Algorithms

Neural networks and genetic algorithms are machine-learning approaches for finding optimal solutions to complex problems. Neural nets take a set of inputs, Which might be various parameters about a community, such as message level, ratio of positive to negative opinion leaders, etc., and discover relative weightings to achieve a desired outcome, such as a predicted stock price. Neural nets have been used successfully in other types of financial forecasting and, analysis. Genetic algorithms evolve solutions to complex problems by imitating the competitive nature of biological genetics. Factors under consideration must be encoded in a binary form and a system for ranking the value of the outcome is created. Software applications used to perform such analyses in the present invention are commercially available from, e.g., Ward Systems Group, Inc. of Frederick, Md.

3. Report Generation Subsystem

Report presentation subsystem 36 extracts the results of the analysis performed by analysis subsystem 34 for presentation to end-users 9. In a preferred embodiment, report generation subsystem 36 and presents into end-users via a Web-based user interface. In this embodiment, the reports are published using a variety of formats, such as, e.g., PDF, HTML, and commercially available spreadsheets or word processors, and the like. End-users 9 may use any suitable Web browser to view and receive the reports generated by report generation subsystem 36. Examples of such Web browsers are available from Netscape, Microsoft, and America Online. In an alternative embodiment, report generation subsystem 36 presents the results in written reports that may be printed and distributed.

Report generation subsystem 36 produces and displays some reports automatically and other reports may be specifically requested by end-users 9. For example, in a preferred embodiment, dynamic content boxes are automatically generated and displayed via a Web server. Such dynamic content boxes may include a report on the current market mood, displaying a visual indicator for the NASDAQ 100, for example. Such a market mood graph may contain the NASDAQ 100 market mood over the last 1 year together with the closing price of the NASDAQ 100 for the same period. Another dynamic content box could, e.g., display the top five companies where activity is spiking the greatest over the last 1 day versus activity recorded over the last 10 days. Alternatively, the dynamic content box could display the top five companies that are being discussed by the top five buy signalers. Other such reports can be generated and displayed automatically such that when end-users 9 connect to the Web server, the reports are presented without the need for requesting the information.

Other reports that may generated by report generation subsystem 36 include for example, a list of the most recent subjects posted by the top buy signaler for each of the top five most positive market mood companies and real-tune trends such as information about postings to Internet based communities. These reports and other may be dynamically built by report generation subsystem 36 based on requests for information from end-users 9. For example, end users 9 may specify a community, a pseudonym or a topic about which detailed information can be presented. For example, if an end-user requests a report concerning pseudonyms meeting a certain criteria, report generation subsystem 36 executes a search of all matching pseudonyms together with the source of the pseudonym (Yahoo, Raging Bull, etc.) and with links to a profile page for each pseudonym.

A pseudonym's profile page comprises another report generated by subsystem 36 and includes, e.g., the pseudonym and its source; an e-mail address of the pseudonym at the community, if one exists; the total number of posts that the pseudonym has made in discussion groups that are being tracked; the number of different topics that the pseudonym has posted to in discussion groups that are being tracked; the most recent posting date that the pseudonym has made to any discussion group and a link to that posting; a list of most recent postings to discussion groups categorized by topics; the pseudonym's reputation score for each category; a graphical representation of the pseudonym's reputation (e.g., FIG. 4); and the like.

In addition to retrieving reports concerning particular pseudonyms, report generation subsystem 36 allows end-users 9 to locate detailed information about each topic (company, book, movie, etc.). For example, if an end-user requests a report on a particular company, by e.g., the stock symbol or the company name, another search is executed. Report generation subsystem 36 displays information such as a list of all matching companies; the name of the company; the stock symbol of the company; and a link to a company profile page where users can obtain detailed information about that particular company.

A company profile is similar to a pseudonym's profile page. That is, the company profile page is another report generated and displayed by report generation subsystem 36. In a preferred embodiment, the company profile page comprises detailed information about a particular company, especially information that relates to postings in stock message forums for that company. Other information that may be displayed indicates, e.g., the name of the company; the stock exchange that the company is a member of; the domain name for the company's home page and a link; a link to the company's stock board on Yahoo, Raging Bull, Motley Fool or other prominent electronic discussion forums; a list of the most frequent posters on the company's stock discussion groups; the top buzz accelerators and the top buzz decelerators for the company's stock discussion groups; and top buy and sell signalers for the company's stock discussion groups.

For other topics, analogous profile pages can be presented. For example, a movie's profile page may comprise the movie's name, the producer, and other objective information as well as identification of the top buzz accelerators and decelerators, and other results of output by analysis subsystem 34.

Pseudonym Registration System

Figure 5:
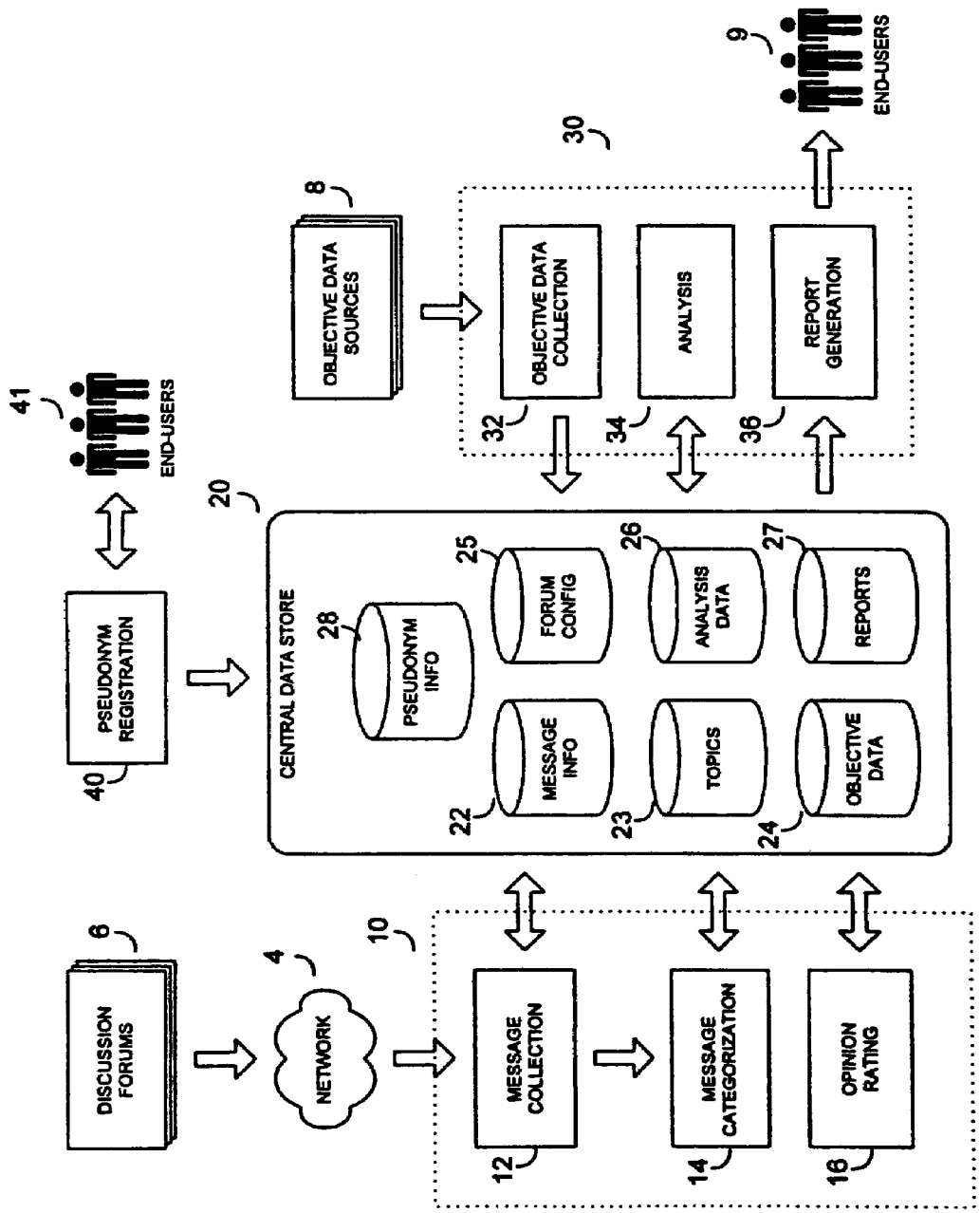
FIG. 5 is a schematic diagram of an embodiment of the present invention comprising a pseudonym registration and tracking service.

As shown in FIG. 5, the present invention may include pseudonym registration system 40. Pseudonym registration system 40 allows end-users, such as end-users 41 to sign-up (or register) for pseudonym services. The services include creation of pseudonyms for use in posting messages to electronic discussion forums; the capability to build a reputation in a community through persistent pseudonym identity, opt-in marketing services (wherein pseudonyms can be registered to receive selected categories of marketing information). For example, an end-user can register one pseudonym and specify an interest in comic books, and register another pseudonym with an interest in stock market forecasts. Although the two pseudonyms belong to the same person, the person can more easily differentiate and select the type of information sought at a particular moment. Moreover, registration with pseudonym registration system 40 provides a means for end-users 41 to provide certain demographic information (age, gender, salary, and the like) without revealing their actual identity.

In a preferred embodiment, pseudonym registration system 40 provides a digital signature that registered pseudonyms may use to prove their identity as a registered synonym. The digital signature allows one pseudonym to be linked to other pseudonyms which may be important to establish a reputation across multiple communities. For example, if an end-user having a pseudonym of john@yahoo.com on the Yahoo message boards wishes to post messages on the Amazon.com message boards, it is very likely that the pseudonym john@amazon.com will already be taken by another individual. In this case, the end-user would have to select an different pseudonym for use on the Amazon message boards, for example, john2@amazon.com. In this case, the end-user can register both pseudonyms with pseudonym registration system 40 and indicate that they belong to the same end-user. When positing messages under either pseudonym, the end-user authenticates his or her identity by providing the digital signature in the message. When other participants in the community see the digital signature, they can verify that the end-user john@yahoo.com is the same end-user john2@amazon.com by checking pseudonym registration system 40.

Pseudonym registration system 40 is a useful addition to the overall operation of the system and method of the present invention. By allowing end-users to register their pseudonyms, the data collected and analyzed may have more points for correlation. End-users are benefited both by better analysis results and by more control over their personal identifying information.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A system for processing message traffic in a plurality of electronic discussion forums, comprising:
    a message collector for collecting messages from the plurality of electronic discussion forums;
    a message processor for processing the messages according to a series of topics, wherein the message processor processes a message to compute a numerical relevance of the message to at least one topic from the series of topics on a numerical scale; and
    a data analyzer for tracking message content posted by a plurality of pseudonyms and the roles of individual participants using the pseudonyms posting in the plurality of electronic discussion forums over time based on the processing of the messages;

wherein the data analyzer is adapted to receive market data describing market events related to the series of topics;

wherein the data analyzer is adapted to process the market data in order to identify correlations or trends for future market events based on a community mood measurement and the community mood measurement is based on a number of new posting pseudonyms compared to a number of old posting pseudonyms for a specific topic.

2. The system of claim 1, wherein the market data comprises stock data.

3. The system of claim 1, wherein the market data comprises box office sales.

4. The system of claim 1, wherein the market data comprises television market shares.

5. The system of claim 1, wherein the data analyzer is adapted to process the market data in order to identify correlations or trends for future market events based on the tracked pseudonyms.

6. The system of claim 1, wherein the data analyzer is adapted to process the market data in order to identify correlations or trends for future market events based on both the tracked pseudonyms and a community mood measurement.

7. The system of claim 1, wherein the community mood measurement is based on changes in discussion levels for a specific topic.

8. A method for processing message traffic in a plurality of electronic discussion forums, comprising the steps of:
   collecting messages from the plurality of electronic discussion forums;
   processing the messages according to a series of topics and computing a numerical relevance of the messages to at least one topic from the series of topics on a numerical scale;
   tracking message content posted by a plurality of pseudonyms and the roles of individual participants using the pseudonyms posting in the plurality of electronic discussion forums over time based on the processing of the messages; and
   receiving market data describing market events related to the series of topics;
   processing the market data in order to identify correlations or trends for future market events based on a community mood measurement and the community mood measurement is based on a number of new posting pseudonyms compared to a number of old posting pseudonyms for a specific topic.

9. The method of claim 8, wherein the market data comprises stock data.

10. The method of claim 8, wherein the market data comprises box office sales.

11. The method of claim 8, wherein the market data comprises television market shares.

12. The method of claim 8, further comprising the step of processing the market data in order to identify correlations or trends for future market events based on the tracked pseudonyms.

13. The method of claim 8, further comprising the step of processing the market data in order to identify correlations or trends for future market events based on both the tracked pseudonyms and a community mood measurement.

14. The method of claim 8, wherein the community mood measurement is based on changes in discussion levels for a specific topic. topics;

wherein the data analyzer is adapted to process the market data in order to identify correlations or trends for future market events based on a community mood measurement and the community mood measurement is based on a number of new posting pseudonyms compared to a number of old posting pseudonyms for a specific topic.

\* \* \* \* \*